United States Patent Office 3,238,818
Patented Mar. 8, 1966

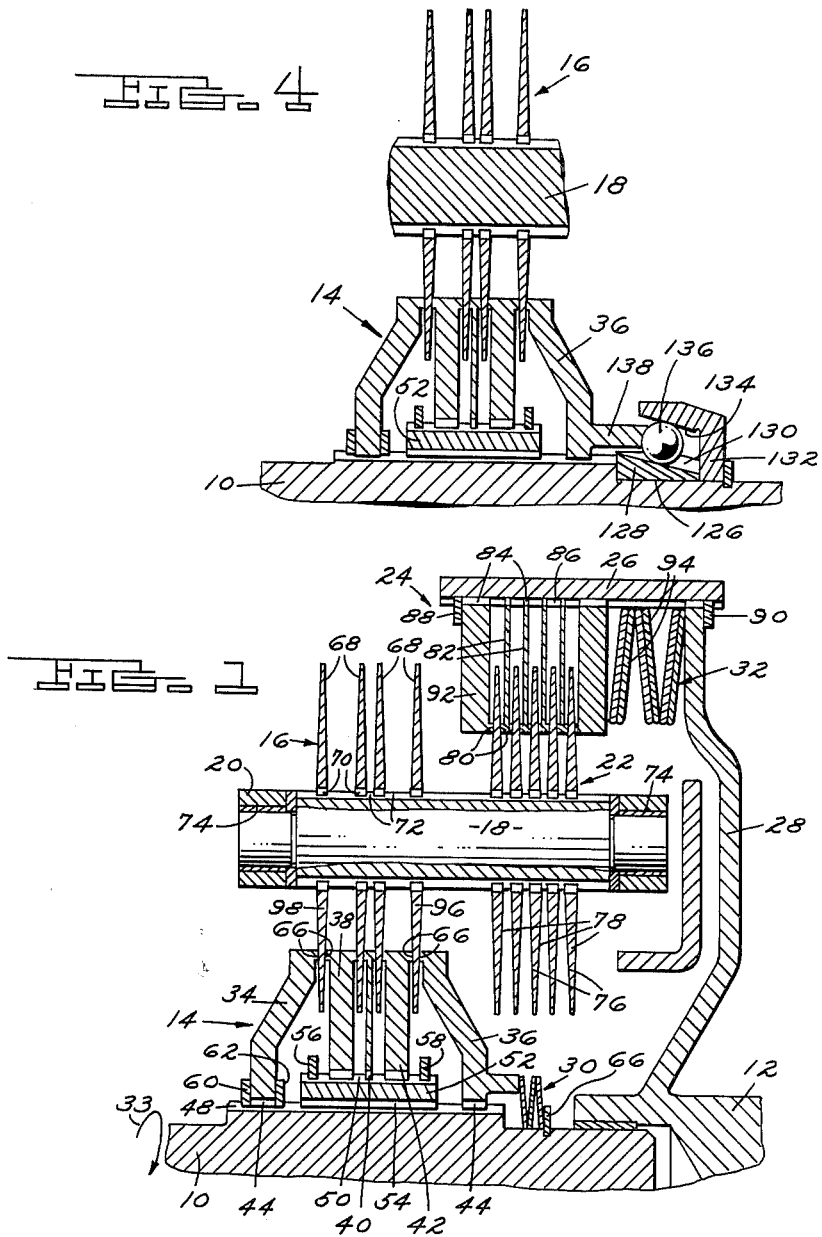

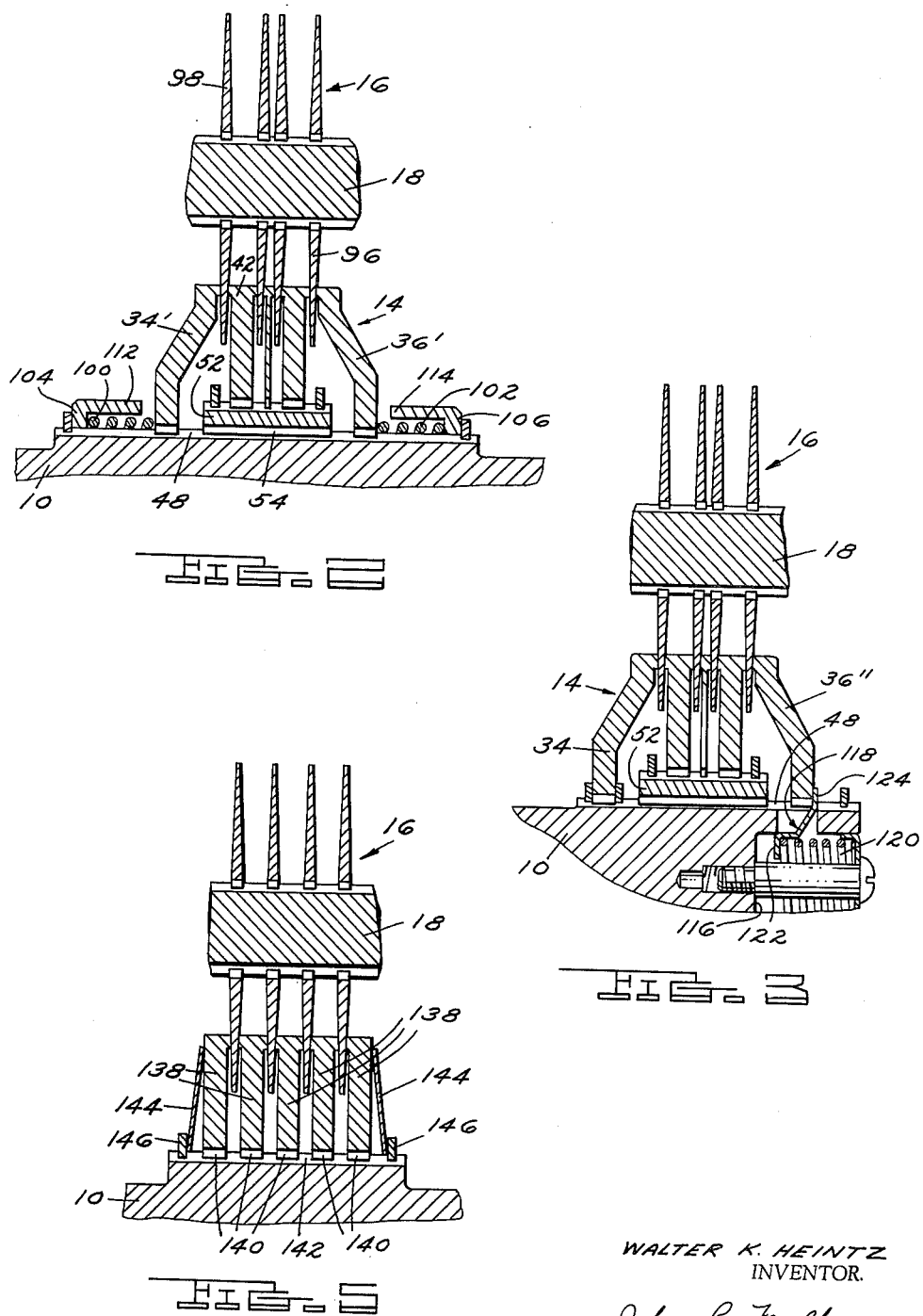

3,238,818
INFINITELY VARIABLE FRICTION DISC DRIVE
Walter K. Heintz, Westfield, N.J., assignor to Ford Motor Company, Dearborn, Mich., a corporation of Delaware
Filed May 10, 1963, Ser. No. 279,474
16 Claims. (Cl. 74—796)

This invention relates to an infinitely variable speed friction driving device. More particularly, it relates to a friction disc torque transmitting device having disc clamping forces that are modulated in proportion to the level of torque to be transmitted by the discs.

One of the objects of the invention is to provide a friction disc drive with a simple disc clamping apparatus operable during torque delivery in either direction to modulate the clamping forces as a function of the torque to be transmitted.

It is another object of the invention to provide a friction disc drive not only with torque sensitive disc clamping apparatus that modulates the clamping forces in proportion to the torque transmitted, but also means providing additional clamping forces independent of the magnitude of, and, in some cases, direction of delivery of torque to be transmitted.

A further object of the invention is to provide a friction disc drive with a mechanical bi-directional torque sensitive clamping device that is simple in construction and provides a compact, overall package.

It is also an object of the invention to provide a friction disc drive with bi-directional torque sensitive clamping means; also, means to provide additional clamping forces that are responsive to the speed of rotation of the driving discs; also, means providing additional clamping forces that comprise spring biasing members providing an initial loading on the discs to transmit torque therebetween to activate the torque sensitive means.

Other objects, features, and advantages of the invention will become apparent upon reference to the succeeding detailed description thereof, and to the drawings illustrating the preferred embodiments thereof; wherein, FIGURE 1 shows a cross-sectional view of one-half of a friction disc drive embodying the invention; and, FIGURES 2, 3, 4 and 5 show modifications of portions of the showing of FIGURE 1.

FIGURE 1 shows an infinitely variable speed friction drive transmission having a power input shaft 10 and a power output shaft 12. The shafts are connected by a friction drive train of the planetary type having, in general, a set of driving sun discs 14, helically splined to the input shaft, frictionally engaging an input stage of planet discs 16. Planet discs 16 are nonrotatably secured on a planet shaft 18 rotatably mounted in a stationary carrier member 20. Spaced axially on shaft 18 from the input stage planet discs 16 is a second set of output stage planet discs 22 frictionally engaging a set of ring discs 24. The ring discs are slidably splined to a drum-like member 26 splined to a radial flange 28 integral with output shaft 12.

Both the sun and ring disc sets 14 and 24 are loaded into clamping engagement with the cooperating planet discs 16 and 22 by means of springs 30 and 32. The springs 30 provide an initial disc clamping force sufficient to cause engagement and transmission of torque between the sun and planet input stage discs; and, are supplemental to the clamping forces provided by the helical splined connection of the driving discs to the input shaft, in a manner which will be described. The springs 32, on the other hand, provide the sole forces for clamping the ring and output stage planet discs 24 and 22 together during all transmissions of torque in either direction between these members.

As stated previously, the planet carrier 20 is stationary. However, the pinion shaft 18 is connected to the carrier in such a manner, such as by a pin and slot type adjustable connection, not shown, that it can be adjusted radially in either direction. This varies the drive ratios of the train from an underdrive to an overdrive of the output shaft 12 with respect to the speed of input shaft 10.

The disc drive operates in a known manner, the discs having a floating frictional contact in a patch area into which is sprayed or otherwise injected a thin film of oil or other suitable lubricant. Clockwise rotation of input shaft 10 and driving discs 14 in the direction of arrow 33 rotates the planet discs 16 and 22 in a counterclockwise direction to drive the ring discs 24 and output shaft 12 in the same direction.

As shown, the friction drive is conditioned substantially for a one-to-one drive ratio between the input and output shafts. This is due to the axis 18 of the planet disc stages being at the same radial distance from the points of contact with the sun and ring disc rim portions. That is, the reduction in the speed of rotation of the planet disc axis 18 as compared to the speed of the points of contact of the discs 16 with the sun discs is equal to the increase in speed of the peripheral contact points of the output stage planet discs 22 contacting the ring discs 24, resulting in the rotation of output shaft 12 at the same speed as input shaft 10.

Progressive radial adjustment of the pinion shaft 18 to increase the distance from the planet axis to the sun disc contact points, while decreasing the radial distance from the axis to the ring disc contact points, will progressively decrease the speed of output shaft 12 with respect to that of shaft 10. That is, it will be underdriven. Conversely, radial adjustment of planet shaft 18 towards the sun discs 14 and away from ring discs 24 will progressively increase the speed of shaft 12 with respect to shaft 10 so that it is progressively driven at faster speeds.

More specifically, the set of input stage sun discs 14 comprise two annular friction discs 34 and 36, and three intermediate annular discs 38, 40 and 42. The end discs 34 and 36 have internal helical spline 44 meshing with a helical spline 48 formed on the input shaft 10. The intermediate discs have straight internal splines meshing with a mating spline 50 on a carrier 52. The carrier has an internal helical spline 54 meshing with the input shaft spline 48. The carrier nonrotatably supports the intermediate sun discs for an axial sliding movement on their splines between end stop members 56 and 58.

The end disc 34 is axially located in a fixed position by snap rings 60 and 62, while the opposite end disc 36 is biased axially towards disc 34 by means of the spring 30 seated against a snap ring 64. It will be clear, therefore, that relative rotation between the input shaft 10 and end disc 36 and carrier 52 will cause a slight angular rotation of the disc and carrier along the helical spline, thus causing an axial movement of the intermediate discs and disc 36 and carrier 52 relative to the input shaft. Thus, axial clamping forces are provided to clamp the sun and planet discs together.

Each of the sun discs have lateral friction contact rims 66, substantially conical in profile, for engagement with lateral conical surfaces of four input stage planet discs 68. The planet discs have internal straight splines 70 meshed with the mating splines 72 of the planet shaft 18 for a sliding axial movement therebetween. The shaft 18 is rotatably mounted in a stationary carrier member 20 by bearings 74.

The annular output stage planet friction discs 76 are similarly splined to the planet shaft 18, and have similar lateral conical surfaces 78 contacting the mating friction contact rims 80 of five annular friction ring discs 82. The ring discs have internal straight splines 84 meshing with a straight spline 86 on drum member 26. The ring discs are confined axially between snap rings 88 and 90 abutting the end disc 92 and the flange 28. A number of Belleville springs 94 arranged in parallel-series relationship provide the necessary compressive force to maintain clamping engagement between the ring and output stage planet discs 82 and 78 at all times.

The assembly described provides a bi-directional torque sensitive apparatus on the input stage side so as to maintain the sun disc clamping forces at a level in proportion to the level of torque to be transmitted in either direction through the discs. In operation, initially, springs 30 and 94 provide the initial clamping forces necessary to engage the sun and ring disc sets 14 and 24 with the planet discs 16 and 22 to permit the initial transmission of torque through the drive train. Initial rotation of input shaft 10, therefore, will rotate the sun discs and planet discs and ring discs. The initial torque of the input shaft and the helical splined connection 44, 48, 54 between the sun discs and input shaft causes a relative angular rotation along the spline between the sun discs and carrier and input shaft. Therefore, upon rotation of input shaft 10 in a clockwise direction (arrow 33), the initial torque differential causes input shaft 10 to rotate ahead of the sun discs and carrier causing them to move axially to the left of FIGURE 1 until snap ring 58 abuts disc 42. Continued axial movement transfers the thrust through the snap ring to move discs 42, 40 and 38 against discs 68, disc 34 acting as a reaction. The input shaft torque therefore causes the carrier snap ring 58 to exert axial clamping forces against the planet discs in proportion to the torque to be transmitted, to drive the planet discs 68.

The end disc 36 at this time exerts only a low clamping force against the end planet disc 96. That is, the force is due mainly to the force of spring 30 alone, since the input torque split to this stage is small in comparison to that through the three intermediate discs 38, 40 and 42. Thus at this time, the three planet discs 68 to the left of disc 36 transmit substantially all of the torque to rotate pinion shaft 18. The output stage planet discs 22 transmit this torque to the ring discs, which are held clamped thereagainst by the springs 94. The output shaft 12 is therefore driven at a speed determined by the radial position of the planet pinion shaft.

As the torque differential between the input shaft and sun driving discs decreases, i.e., the relative speed differential decreases, the disc clamping forces likewise decrease. This is due to the helically splined connections causing a backing off of the carrier and disc 36 towards their previous positions shown. The clamping forces at this time will be adequate since the decrease in the torque load requires less clamping forces to maintain driving contact between the sun and planet discs.

Thus, it will be seen that the discs are initially loaded with a spring clamping force that is independent of the magnitude and direction of torque delivery. The introduction of torque from the input shaft is reflected by the helical connection between it and the sun discs to provide additional clamping forces that are modulated in proportion to the level of torque to be transmitted. The disc clamping forces are thus maintained at the proper level, thereby increasing the wearlife of the parts and maintaining high operational efficiency.

During a coast operation, when the output shaft 12 becomes the torque input member, the ring discs 82 function in the same manner as before to transmit the drive to planet discs 78 and 68. Spring 30 at this time maintains initial clamping engagement between the planet discs and sun discs sufficient to transmit torque therebetween. The forward rotation of the planet discs 68 and the sun discs relative to the input shaft causes axial movement of the carrier 52 to the right to abut top 56 against the intermediate sun disc 38 and apply a clamping force to discs 68 in proportion to the torque input of the planet discs. The fixed position of sun disc 34 at this time effects no clamping of end planet disc 98 at all, and therefore permits its free rotation.

It will therefore be seen that the initial driving engagement provided by the spring bias permits push-starts of a vehicle and coast starts of a stalled engine. That is, the initial engagement provides sufficient clamping forces to effect relative rotation between the planet and sun discs, and thereby cause operation of the torque sensitive connections to provide the additional main disc clamping forces.

FIGURE 2 shows a modification of the friction drive shown in FIGURE 1. In FIGURE 1, the spring clamping acted from one end only, resulting in the planet disc 98 rotating completely free during a reversal in the direction of delivery of torque. In FIGURE 2, the end sun disc 34', instead of being fixed axially by the snap rings 60, 62, as in FIGURE 1, is mounted in the same manner as the opposite end sun disc 36'. That is, they are both free to move axially upon relative rotation between the sun discs and input shaft due to torque input differential. In this embodiment, the two end sun discs 34' and 36' and carrier 52 are again helically splined to the input shaft 10. Both of the end sun discs are spring loaded into clamping engagement with the planet discs by means of compression springs 100 and 102 seated in flanged annular retainers 104 and 106 rotatably mounted on the input shaft splines 48. The retainers are held in one axial direction by snap rings 108 and 110. They have extensions 112 and 114 constituting stops for the movements of the end sun discs in either direction, depending upon the direction of torque delivery, to provide reaction members for clamping the sun and planet discs together. The other details of construction are identical with those shown in FIGURE 1 and therefore are not repeated.

The operation is believed to be clear, and is substantially identical to that of the friction drive shown in FIGURE 1; with the exception, however, that in torque delivery from the output to the input shaft, the planet disc 98 now is lightly loaded into engagement with the intermediate sun disc 42 instead of being free as in FIGURE 1 construction. Thus, it is loaded in the same manner as the opposite disc 96 is loaded during torque delivery in the other direction. Therefore, in this embodiment, although one of the planet discs 96 or 98 is transmitting torque only to a small degree, depending upon the direction of torque delivery, all discs transmit torque at all times. In comparison, in FIGURE 1, the planet disc 98 rotates freely during reverse torque delivery.

FIGURE 3 shows another modification of the input stage of the friction drive, which is similar to that shown in FIGURE 1. In this embodiment, however, the input shaft 10 is provided with a recess 116 within which a force transferring member 118 is biased by a spring 120 against the end sun disc 36" to provide initial clamping forces between the sun and planet discs 14 and 16. The retainer comprises an annular cup-like member 122 with radial finger portions 124 projecting between splines 48 in the input shaft. The finger portions always bear against the end sun disc 36" and bias it into engagement with the other discs in the same manner as with the spring 30 of FIGURE 1. The operation and other details are identical with that of FIGURE 1.

FIGURE 4 shows another modification similar to FIGURES 1 and 3. However, instead of the disc spring clamping force that is independent of the magnitude of torque transmitted, in this case, speed responsive ball members are used for zero start-up torque possibilities. In this instance, the input shaft 10 is provided with a recess 126 containing a first annular sleeve 128 having a ramp or incline 130, and a second flange sleeve member 132 having a ramp or incline 134 parallel to the first ramp. Both ramps cooperate with a plurality of circumferentially arranged ball members 136 centrifugally movable along the ramps to abut and move the axial projection 138 on the end sun disc 36.

With this construction, when the discs 14 and 16 are at rest, no clamping forces are exerted thereon. However, as soon as the input shaft 10 begins to rotate, centrifugal force acting on the rotating balls 136 force them to move up the ramps to the left, exerting axial forces against the end sun disc 36 sufficient to provide initial torque transmission between the sun and planet discs 14 and 16. Thereafter, the torque sensitive carrier 52 and sun discs 14 will operate in the manner previously described to provide axial thrust clamping forces in proportion to the torque transmitted.

FIGURE 5 shows a still further modification of the input stage friction drive of FIGURE 1. In the previous FIGURES 1–4 constructions, the thrust forces acting on the intermediate and end sun discs and planet discs were not additive, since the torque of the input shaft was applied to the carrier 52 and not individually to the intermediate sun discs. The thrust resulting from the helically splined connection was transferred through the snap ring 58 to the intermediate discs, which have a straight splined connection to carrier 52.

In FIGURE 5, however, each of the sun discs 138 are individually connected by helical splines 140 to the helical spline 142 of the power input shaft 10. Thus, each of the sun discs receives the same amount of torque from the input shaft so that the axial thrust forces occasioned by relative rotation between the input shaft and sun discs 138 increases progressively in the direction of the movement of the sun discs on the helical splines, regardless of the direction of torque delivery. In this figure, the discs 138 are initially loaded into clamping engagement with the planet discs 16 by means of Belleville springs 144 applied against opposite end discs. The springs are held axially in position by snap rings 146.

From the foregoing, therefore, it will be seen that the invention provides a friction drive mechanism that is torque sensitive in either direction of torque delivery to clamp the friction discs together with forces modulated at all times in proportion to the torque to be transmitted. Thus, regardless of the magnitude and direction of torque to be transmitted, the invention always provides clamping forces that are proper for the particular torque level, thus minimizing wear of the parts, and providing highly efficient operation by reducing friction and other losses.

Additionally, it will be seen that the invention provides clamping forces that are independent of the magnitude and direction of torque application so as to provide initial start-ups, as well as push-starts and coast starts.

While the invention has been illustrated in its preferred embodiments, it will be clear to those skilled in the arts to which the invention pertains that many changes and modifications may be made thereto without departing from the scope of the invention.

I claim:

1. A friction disc drive torque transmitting device comprising a power input shaft, a plurality of axially aligned and spaced friction driving discs rotatable in one direction about a first axis, a plurality of friction driven discs rotatable in the opposite direction about a second axis radially spaced from said first axis, said driven discs being in interdigited relationship with said driving discs for the drive of one plurality of said discs in one direction upon rotation of the other plurality of said discs in the opposite direction, means mounting said driving and driven discs for an axial movement relative to said input shaft, said latter means including helical splined connections operably connecting said driving discs to said input shaft, said connections urging said discs axially upon relative rotation between said shaft and latter discs in either direction, and stop means in the path of axial movement of portions of said discs in either direction providing a reaction for the clamping of at least a pair of said driving and driven discs together with forces that vary in proportion to the level of torque to be transmitted between the discs upon continued relative rotation between said driving discs and input shaft.

2. A friction disc drive device as in claim 1, including means operably connected to at least one of said plurality of discs initially clamping said discs together by forces independent of the torque to be transmitted between said discs.

3. A friction disc drive device as in claim 2, wherein said latter means comprises a spring.

4. A friction disc drive device as in claim 2, wherein said latter means comprises spring means biasing opposite end driving discs toward each other and into clamping engagement with said driven discs.

5. A friction disc drive device as in claim 2, wherein said latter means comprises speed responsive means rotatable with said input shaft and abutting one of said plurality of discs.

6. A friction disc drive device as in claim 1, wherein said stop means includes means securing at least one of said driving discs against axial movement in either direction relative to said input shaft.

7. A friction disc drive device as in claim 1, wherein said stop means includes a portion fixedly secured to said input shaft.

8. A friction disc drive torque transmitting device comprising a power input shaft, a plurality of axially aligned and spaced friction driving discs rotatable in one direction about a first axis, a plurality of friction driven discs rotatable in the opposite direction about a second axis radially spaced from said first axis, said driven discs being in interdigited relationship with said driving discs for the drive of one plurality of said discs in one direction upon rotation of the other plurality of said discs in the opposite direction, a disc carrier, said carrier and the outer axial portions of said driving discs having helical splined connections to said input shaft urging said latter discs and carrier axially upon relative rotation between said shaft and latter discs and carrier in either direction, means axially slidably connecting the remaining of said plurality of driving discs to said carrier, and stop means in the path of axial movement in either direction of a portion of said discs providing a reaction for the clamping of at least a pair of said driving and driven discs together with forces that vary in proportion to the level of torque to be transmitted between the discs upon continued relative rotation between said driving discs and input shaft.

9. A disc drive device as in claim 8, and including means connected to said carrier transmitting the axial movement of said carrier to the remaining of said plurality of driving discs.

10. A friction disc drive device as in claim 8, including means operably connected to at least one of said plurality of discs initially clamping said discs together by forces independent of the torque to be transmitted between said discs.

11. A friction disc drive device as in claim 10, wherein said latter means comprises a spring.

12. A friction disc drive device as in claim 10, wherein said latter means comprises spring means biasing opposite end driving discs toward each other and into clamping engagement with said driven discs.

13. A friction disc drive device as in claim 10, wherein said latter means comprises speed responsive means rotatable with said input shaft and abutting one of said plurality of discs.

14. A friction disc drive device as in claim 8, wherein said stop means includes means securing at least one of said driving discs against axial movement in either direction relative to said input shaft.

15. A friction disc drive device as in claim 8, wherein said stop means includes a portion fixedly secured to said input shaft.

16. A disc drive as in claim 9, wherein said means connected to said carrier includes means located on opposite axial portions of said carrier at least one of which abuts at least one of said remaining of said plurality of driving discs upon axial movement of said carrier in either direction to move said one disc axially and clamp said discs together against said stop means.

References Cited by the Examiner

UNITED STATES PATENTS

| | | | |
|---|---|---|---|
| 1,771,072 | 7/1930 | Beggs | 192—43 |
| 1,775,479 | 9/1930 | Arter | 74—796 |
| 2,023,690 | 12/1935 | Lyman | 192—105 X |
| 2,214,819 | 9/1940 | Kiep et al. | 192—54 X |
| 2,245,988 | 6/1941 | Lambert | 192—54 X |
| 2,351,996 | 6/1944 | Morgan | 192—54 |
| 2,407,022 | 9/1946 | Lambert | 192—54 |
| 2,583,496 | 1/1952 | Rougelot | 74—199 |
| 2,721,639 | 10/1955 | Miller | 192—54 |
| 2,743,621 | 5/1956 | Bier | 74—199 |

FOREIGN PATENTS

| | | |
|---|---|---|
| 1,229,249 | 9/1960 | France. |
| 110,058 | 3/1944 | Sweden. |

DON A. WAITE, *Primary Examiner.*

DAVID J. WILLIAMOWSKY, *Examiner.*